INVENTOR.
PETER LEFFERTS
BY
Morgan, Finnegan, Durham + Pine
ATTORNEYS

INVENTOR.
PETER LEFFERTS

BY

Morgan, Finnegan, Durham & Pine
ATTORNEYS

INVENTOR.
PETER LEFFERTS

BY

Morgan, Finnegan, Durham & Pine
ATTORNEYS

INVENTOR.
PETER LEFFERTS
BY
Morgan, Finnegan, Durham & Pine
ATTORNEYS

United States Patent Office 3,264,569

Patented August 2, 1966

3,264,569

TRANSIENTLY REGENERATIVE AMPLIFIER WITH A.C. AND D.C. REGENERATION

Peter Lefferts, Hopewell, N.J., assignor, by mesne assignments, to TIA Electric Company, Laurence Township, N.J., a corporation of New Jersey Filed Dec. 7, 1964, Ser. No. 418,587
33 Claims. (Cl. 330—9)

Figure 1:
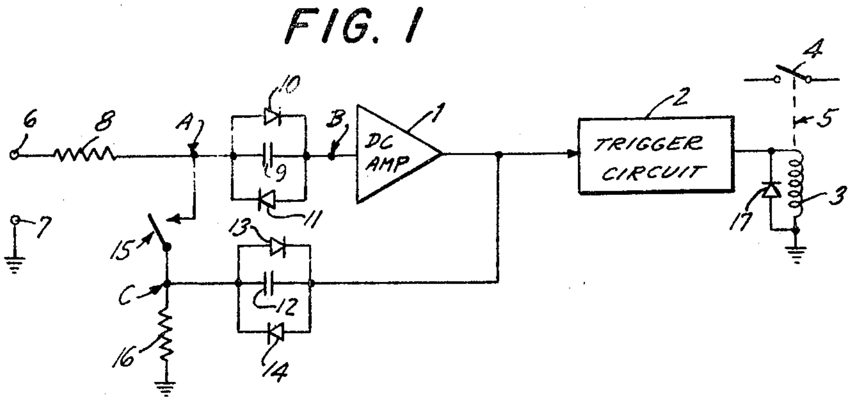

This application is a continuation-in-part of application Serial No. 349,030, filed March 3, 1964, and now abandoned, in the name of Peter Lefferts.

This invention relates to signal translating, and more particularly, to controlled regenerative translating techniques.

In an earlier co-pending application, Serial No. 258,735, filed February 15, 1963, in the name of Peter Lefferts, several controlled regenerative amplifier circuits are illustrated which become regenerative intermittently. During the non-regenerative period in the operation of these circuits, the amplifier is relatively insensitive and produces no significant response to the input signal. During the regenerative period in the operation, the circuit responds to extremely small input signals and provides a relatively large output signal indicative of the input signal. By intermittently making the circuit regenerative and non-regenerative, the input signal is repetitively sampled and successive output signals are provided indicating the presence of the input signal and the polarity thereof.

Some of the circuits shown in the co-pending application employ an intermittently operable D.C. regenerative loop in combination with an amplifier. In these circuits the inherent noise, which is primarily of a D.C. nature in semiconductor amplifiers, e.g., drift, leakage and very low frequency flicker noise, feeds back to the input circuit and tends to contaminate the input signal. Thus, the smallest signal which can accurately be detected by these circuits must be of a magnitude several times greater than the magnitude of the noise signal.

The co-pending application also illustrates circuits with A.C. regenerative loops including series capacitors. These circuits have the tendency to oscillate, and hence, are useful to provide polarity responsive output indications only if the sampling time is less than the quarter cycle time of the natural oscillating frequency and the recovery time between successive samples is relatively long compared to the actual sampling time. It has been found necessary to employ relatively large capacitors in the regenerative loop in order to achieve output signals with a useful duration. These relatively large capacitors limit sensitivity of the circuit and place a limit upon the smallest input signal which can be detected accurately.

An object of this invention is to provide an intermittently regenerative circuit capable of accurately detecting exceedingly small electrical signals.

Another object is to provide an intermittently regenerative amplifier circuit which prevents the amplifier generated noise from contaminating the input signal to any significant degree.

Still another object is to provide an intermittently regenerative amplifier circuit which includes an A.C. regenerative loop but which will not oscillate.

Yet another object is to provide an intermittently regenerative circuit which collects and stores an input signal over a relatively long period of time and which thereafter release the stored energy over a relatively short period of time to thereby multiply the effective strength of the input signal.

Figure 2B:
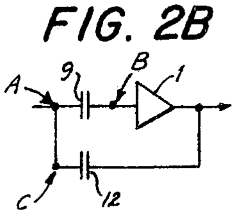
Figure 2C:
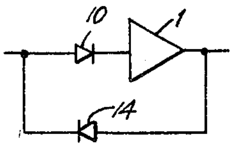
Figures 2, 2A:
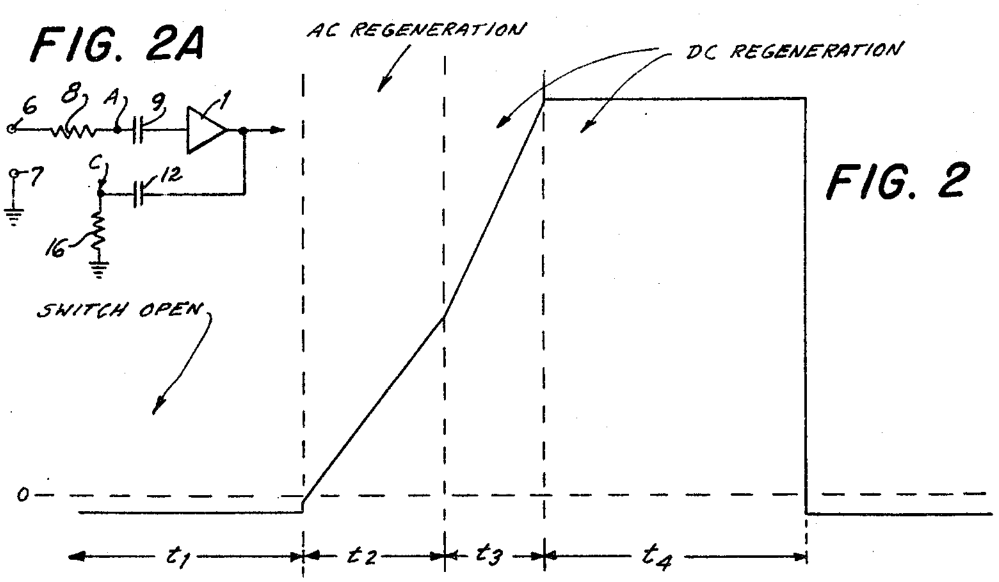
Figure 3:
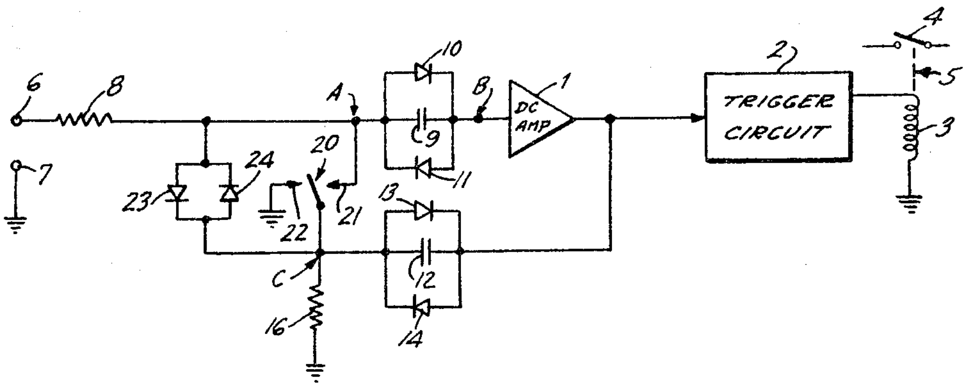
Figure 4:
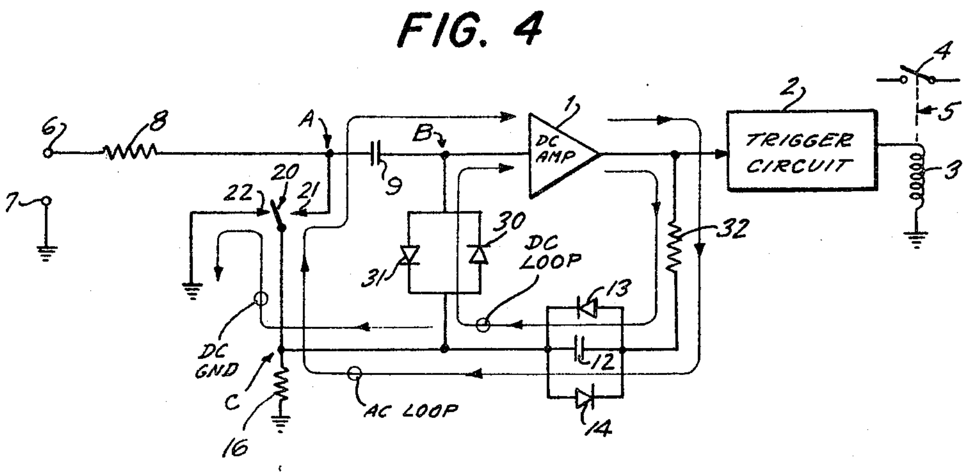
Figure 5:
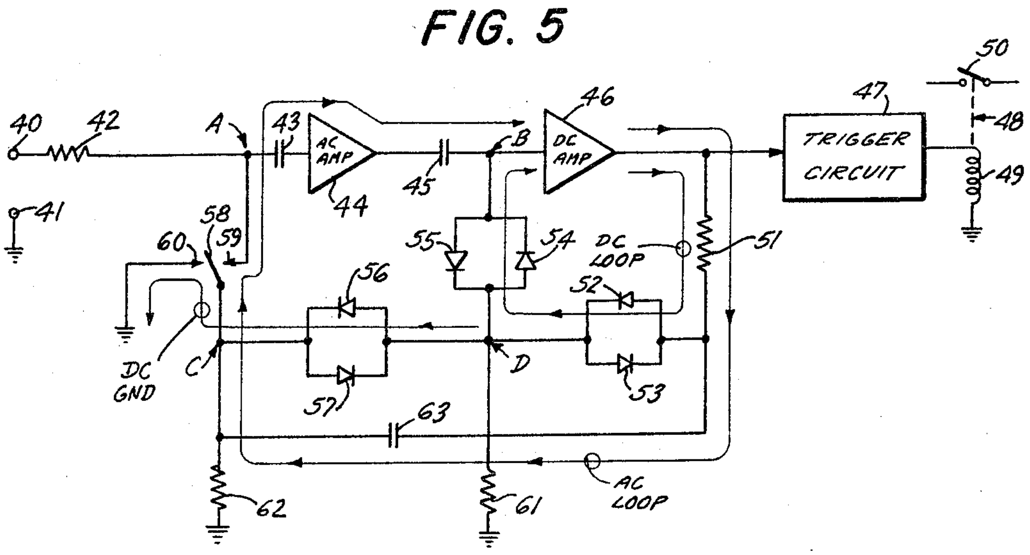
Figure 6:
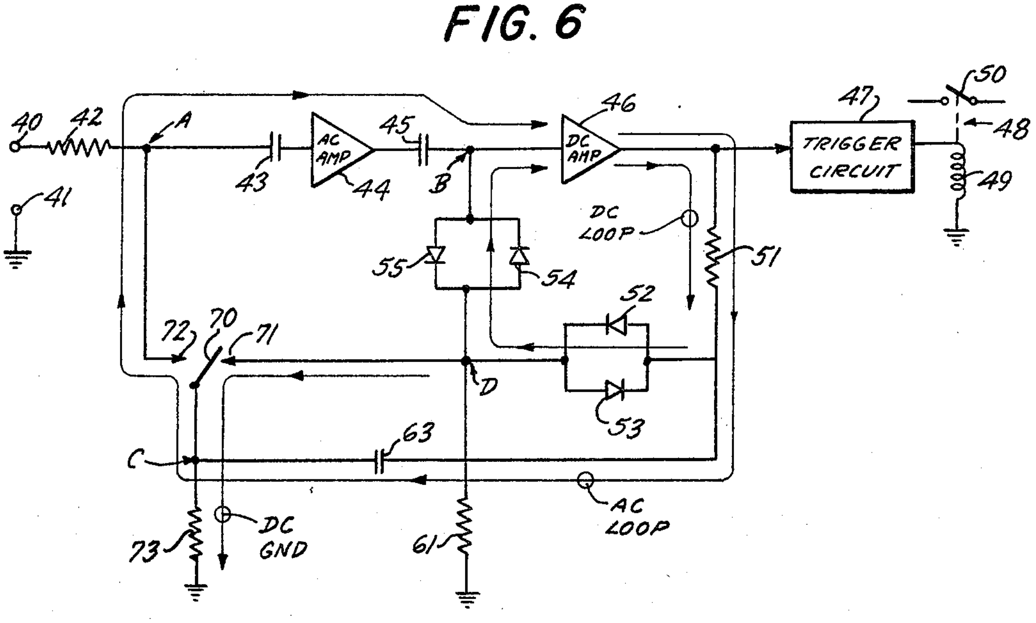
Figure 7:
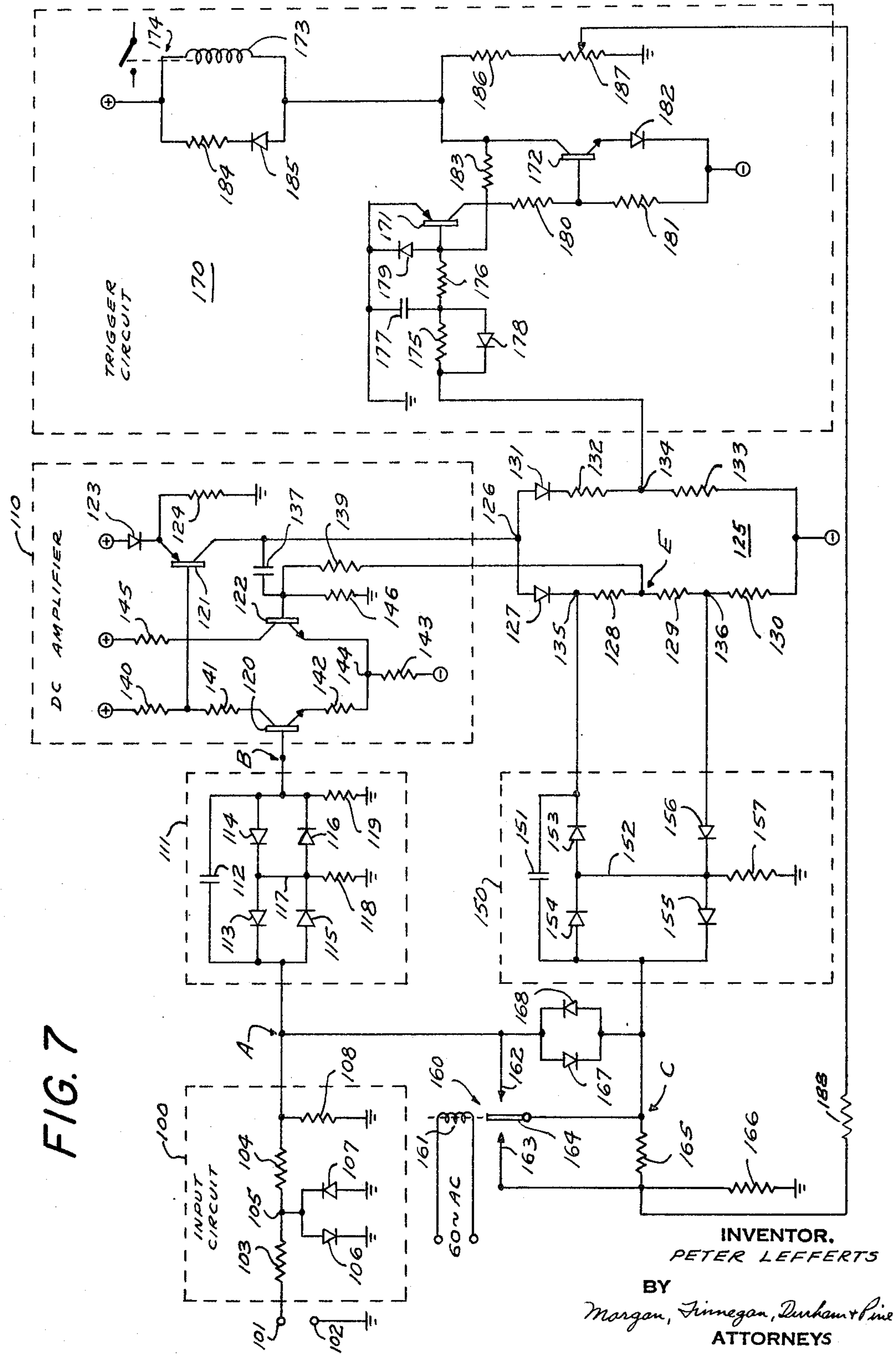

The manner in which the foregoing and other objects are achieved is more fully explained in the following specification describing a few illustrative embodiments of the invention. The drawings are part of the specification and include:

FIG. 1 which is a schematic diagram illustrating an intermittently regenerative circuit in accordance with one embodiment of the invention;

FIG. 2 which is a diagram illustrating the potential which appears at junction A in FIG. 1;

FIGS. 2A–2C which are partial schematic diagrams illustrating the effective portions of the circuit at various periods during hte operation;

FIG. 3 which is a schematic diagram illustrating another embodiment of the invention constructed to eliminate problems associated with switch bounce;

FIG. 4 which is a schematic diagram illustrating another embodiment of the invention similar to that shown in FIG. 3;

FIG. 5 which is a schematic diagram illustrating an embodiment of the invention employing an A.C. amplifier in addition to a D.C. amplifier;

FIG. 6 which is a schematic diagram illustrating another embodiment of the invention similar to that shown in FIG. 5; and FIG. 7 which is a schematic diagram illustrating an embodiment similar to that shown in FIG. 2.

In essence, the intermittently regenerative amplifier circuits in accordance with this invention include both an A.C. regenerative loop and a D.C. regenerative loop. The amplifier is isolated from the input portion of the circuit by means of a relatively small capacitance and, therefore, the D.C. and low frequency noise generated by the amplifier cannot contaminate the input signal. When the regenerative loops are intermittently completed, the D.C. regenerative loop is at first ineffective whereas the A.C. regenerative loop is completed via the aforementioned capacitance. The A.C. regeneration begins to increase the amplitude of the output signal, but before oscillation can occur, the D.C. regenerative loop becomes effective to drive the amplifier into a state of saturation. After a suitable period of time the regenerative loops are interrupted and the input signal is then again sampled.

Referring to FIG. 1, one embodiment of the invention is illustrated and includes a conventional D.C. amplifier 1 which is of the non-inverting type so that the output signal is of the same polarity as the input signal applied thereto. An amplifier with a moderate gain of ten is sufficient. Preferably the amplifier should be designed for maximum stability which can easily be achieved by conventional negative feedback techniques within the amplifier.

The output of amplifier 1 is connected to a D.C. level responsive trigger circuit 2 which may be a conventional Schmitt trigger circuit. The trigger circuit becomes activated when a positive signal of a predetermined amplitude is applied. The circuit remains activated and produces a uniform output signal until the applied signal is reduced below a second predetermined amplitude. This second amplitude level can be positive, but is preferably slightly negative. The output of trigger circuit 2 is connected to selectively energize a winding 3 of a relay 5 having associated contacts 4.

The input signal can be applied to the circuit between input terminals 6 and 7, the latter terminal being connected to ground. Terminal 6 is connected to one plate of a capacitor 9 via a resistor 8 and a junction point A, the junction being located between the resistor and the capacitor. The other plate of capacitor 9 is connected to the input of amplifier 1 via a junction point B. A pair of oppositely poled silicon semiconductor diodes 10 and 11 are each connected in parallel with capacitor 9 with the cathode of diode 10 connected to junction B and the cathode of diode 11 being connected to junction A.

The regenerative loops are intermittently completed by means of a switch 15 which can be of the conventional mechanical chopper type actuated by a suitable A.C. energized coil. The stationary contact of switch 15 is connected to junction A and movable contact is connected to the output of amplifier 1 via a capacitor 12. A pair of oppositely poled silicon semiconductor diodes are each connected in parallel with capacitor 12 with the cathode of diode 13 being connected to the output of amplifier 1 and the cathode of diode 14 being connected to the movable contact of switch 15. The movable contact of switch 15 is also connected to ground via a resistor 16. The common connection of the movable contact, resistor 16 and capacitor 12 is designated as junction C.

The semiconductor diodes can be considered as non-conductive when reversed biased, i.e., when the cathode is positive with respect to the anode. The diodes are also essentially non-conductive when biased in the forward direction until the forward conducting threshold voltage of approximately 0.4 volt is exceeded. After the forward conducting threshold voltage is exceeded, the diodes become fully conductive. The diodes referred to in this specification are preferably silicon semiconductor diodes or diodes having equal or larger conductance blocking ability at low voltages.

The operation of the circuit shown in FIG. 1 is explained by referring to FIG. 2 which illustrates the potential appearing at junction A. Assume that a small negative input signal is applied, i.e., negative at terminal 6, and that switch 15 is open during the initial time interval $t_1$. The input signal is smaller than the forward conducting threshold voltage of the diodes, and therefore, all of the diodes are non-conductive. Since switch 15 is in the open position there is no connection between junctions A and C, and thus, the effective circuit during time interval $t_1$ is as shown in FIG. 2A.

Under these conditions, the plate of capacitor 9 connected to junction A is charged to a potential corresponding to the small negative input signal. Capacitor 9 prevents any D.C. noise or low frequency flicker noise generated by amplifier 1 from reaching junction A and, hence, even though the amplifier D.C. and low frequency noise level may be many times larger than the input signal, this noise has no substantial effect upon the potential appearing at junction A. Resistor 16 places the plate of capacitor 11 connected to junction C at ground potential.

Switch 15 is closed at the beginning of time interval $t_2$ connecting junction C to junction A and, therefore, the circuit is as shown in FIG. 2B. This connection completes an A.C. regenerative loop between the output and input of amplifier 1 via capacitors 9 and 12. Just prior to the closing of switch 15, junction C was at ground potential and junction A was somewhat negative, and therefore, when the junctions are connected together by the closing of switch 15, the potential at junction A is driven in a positive direction toward ground potential. As a result, a positive going transient appears at junction B and is amplified by amplifier 1. The resulting amplified positive transient at the output of amplifier 1 is coupled back to the input of the amplifier via capacitors 12 and 9 and is of the proper polarity to bring about regeneration. Thus, during time interval $t_2$, the potential at junction A, and at the output of amplifier 1, becomes increasingly positive due to the A.C. regeneration in the feedback loop completed through capacitors 12 and 9.

It should be noted that electrical energy from the input signal is collected and stored on capacitor 9 while switch 15 is open, that is, during time interval $t_1$ capacitor 9 charges to a potential equal to the difference between the input potential at junction A and the low frequency noise potential (which can be considered constant during a sampling cycle) at junction B. If switch 15 is a conventional 60 cycle mechanical chopper switch, time interval $t_1$ will be on the order of 8 milliseconds. Thereafter, when switch 15 closes and connects junction C to junction A, the potential at junction A is driven toward ground potential. The charge across capacitor 9 cannot change instantaneously, and therefore, the potential at junction B must follow the change of potential at junction A. The transient potential at junction B is produced in a fraction of a microsecond. The relatively long charge period and extremely short transient producing period multiplies the effective strength of the input signal.

As the potential in the A.C. regenerative loop increases, the potential across capacitors 9 and 12 also increases and eventually exceeds the forward conducting threshold voltages of two of the diodes. With the negative input signal being considered, diodes 10 and 14 become conductive to complete a D.C. regenerative loop as shown in FIG. 2C. Thus, during time interval $t_3$, the positive potential appearing at the output of amplifier 1 is coupled back to the input of the amplifier via diodes 10 and 14, and therefore, the potential at junction A and the potential at the output of the amplifier are both driven further positive. This D.C. regenerative action continues until the amplifier reaches a state of saturation which occurs when the amplifier produces its maximum output potential. The D.C. regeneration maintains this state of saturation during time interval $t_4$ which continues as long as switch 15 remains closed. It should be noted that diodes 10 and 14 shunt capacitors 9 and 12 and prevent oscillation which would otherwise occur if only the A.C. regenerative loop were present.

Trigger circuit 2 is designed so that the large positive output signal produced by the amplifier exceeds the turn-on signal level of the trigger circuit. Thus, in the situation being considered, the trigger is ultimately activated to energize relay 5 and indicate the presence of the small negative signal at terminals 6 and 7. Preferably, a free wheeling diode 17 is connected across winding 3 to absorb inductive spikes generated by the inductance of the winding. If trigger circuit 2 is of the type where the turn-on and turn-off signal levels are both positive, the trigger circuit provides successive output pulses corresponding to sampling period during which the applied input signal at terminals 6 and 7 is negative. With this type of trigger circuit, free wheeling diode 17 tends to maintain winding 3 energized between successive pulses. If trigger circuit 2 is of the type where the turn-off signal level is negative, then the trigger circuit, once activated by the presence of a negative input signal at terminals 6 and 7, remains activated until the input signal at terminals 6 and 7 changes polarity. The latter type of trigger circuit is preferable since the relay is usually energized by a continuous output signal rather than by a series of pulses and, therefore, power required for energizing the relay can be supplied by smaller components. If relay 5 does not become energized, this is an indication that the input signal is either zero or positive.

The circuit shown in FIG. 1 is also operative to indicate the presence of small positive signals. The only difference in the operation is that diodes 11 and 13 become conductive during time intervals $t_3$ and $t_4$ to complete the D.C. regeneration loop. Also, the small positive input signal provides a large negative amplifier output signal, and hence, the trigger circuit should be modified so that it responds to negative signals. In some cases it may be desirable to connect two trigger circuits to the output of amplifier 1, one of these trigger circuits being responsive to positive signals and the other being responsive to negative signals.

The size of resistor 8 and capacitors 9 and 12 are selected in accordance with the desired sensitivity. Resistor 8 may be on the order of 1 meghom and capacitor 9 may be on the order of 500 pf. (500 micromicrofarads). Capacitor 12 is preferably larger than capacitor 9 since this tends to drive the potential at junction A closer to ground potential when switch 15 is initially closed and, hence, tends to increase the magnitude of the resulting transient potential appearing at junction B. Capacitor 12 is typically on the order of 1000 pf. (1000 micromicrofarads). With these values of components the circuit shown in FIG. 1 is easily capable of detecting the presence of a 1 millivolt signal at a current level of 1 nanoamp and hence, the circuit is capable of detecting electrical energy as small as $10^{-12}$ watts. The high input impedance of the circuit prevents any significant loading upon the circuits supplying the input signal.

Switch 15 could be a manually operated switch, but in most installations it is desirable to use a convenitonal continuously operating chopper switch so that the input signal is sampled repetitively. In other words, if the chopper switch operates at a 60 cycle per second rate, the input signal is sampled, and a corresponding output signal produced, every 16 milliseconds. The chopper switch operating speed should be selected in accordance with the anticipated rate of change in the input signal, that is, so that the input signal changes at a slow rate compared to the rate at which the chopper switch operates.

The circuit illustrated in FIG. 3 is similar to that shown in FIG. 1, but is designed to eliminate problems associated with switch bounce which may occur as the switch contacts become old and worn. Referring to FIG. 1, it should be noted that the potential at junction A reverses its polarity due to the regeneration just after switch 15 is initially closed. If the switch bounces upon closing, the contacts open momentarily breaking the regenerative loop, and then close again before the input signal is again established at junction A. As a result, the circuit may respond to the reversed polarity signal appearing at junction A due to the regeneration instead of responding to the actual input signal. To eliminate this problem, a single pole double-throw switch 20 and a pair of shunting diodes are employed as shown in FIG. 3. Other circuit components are the same as in FIG. 1, and hence, like reference numerals are employed.

Switch 20 can be a conventional mechanical chopper switch including two stationary contacts. Normally, a coil (not shown) adapted for a 60 cycle energization would be associated with the movable contact so that the stationary contacts are connected to the movable contact alternately for appoximately equal periods of time. The movable contact is connected to junction C, stationry contact 21 is connected to junction A and stationary contact 22 is connected to ground. Semiconductor diodes 23 and 24 are connected in parallel between junctions A and C, or in other words, between stationary contact 21 and the movable contact. The diodes are poled in opposite directions with the cathode of diode 24 connected to junction A and the cathode of diode 23 connected to junction C.

Normally, if there is any contact bounce, this will occur during time interval $t_4$ (FIG. 2) since time intervals $t_2$ and $t_3$ are usually less than a microsecond. Thus, if the connection to stationary contact 21 is momentarily interrupted, the D.C. regenerative loop is completed through one or the other of diodes 23 and 24 until the connection to stationary contact 21 is again established. In other words, the momentary interruption of the connection to stationary contact 21 does not break the D.C. regenerative loop and, hence, does not effect the operation of the circuit. Feedback is interrupted after interval $t_4$ (FIG. 2) when the movable contact moves to the alternate position connecting stationary contact 22 to junction C thereby grounding the regenerative loops. Diodes 23 and 24 do not affect the input signals since the input signal applied at terminal 6 is generally much smaller than the forward conductance voltage of the diodes.

Diodes 23 and 24 also eliminate the effect of a momentary contact interruption during time interval $t_3$ in essentially the same fashion. In the unlikely event that contact interruption should occur during time interval $t_2$, the intrinsic capacitance of diodes 23 and 24 would normally be sufficient to prevent complete interruption of the A.C. regenerative loop. Also diodes 23 and 24 become somewhat conductive before their forward conducting threshold voltage is exceeded. If the impedance across one of the diodes is less than the internal impedance of amplifier 1, regeneration will be sustained by partial conduction of the diode even though the diode is not fully conductive.

The circuit illustrated in FIG. 4 is a modification of the circuit shown in FIG. 3 whereby one set of diodes can be eliminated. More specifically, a single pair of oppositely poled semiconductor diodes 30 and 31 are connected in parallel with one another between junctions B and C to replace diodes 10, 11, 23 and 24 in FIG. 3. The cathode of diode 30 is connected to junction B and the cathode of diode 31 is connected to junction C. A resistor 32 is shown connected between capacitor 12 and the output of amplifier 1. This resistor is optional and in some cases may be inserted for current limiting.

The A.C. regenerative loop in FIG. 4 can be traced from the output of amplifier 1 through resistor 32, capacitor 12, switch 20, and capacitor 9 back to the input of the amplifier. The D.C. regenerative loop can be traced from the output of amplifier 1 through resistor 32, one or the other of diodes 13 and 14, one or the other of diodes 30 and 31, back to the input of the amplifier. Thus, diodes 30 and 31 effectively shunt capacitor 9 to complete the D.C. regenerative loop. Also, diodes 30 and 31 are effectively connected between the movable contact of switch 20 and stationary contact 21 to thereby eliminate switch bounce problems. The regenerative loops are interrupted by grounding junction C via stationary contact 22 of switch 20.

As can be seen from FIG. 4, it is not necessary for the A.C. and D.C. regenerative loops to follow the same general path. Thus, it is possible to insert an A.C. amplifier in the portion of the A.C. regenerative path which is not common with the D.C. regenerative path in the manner illustrated in FIG. 5.

Input signals can be applied to input terminals 40 and 41, the latter terminal being connected to ground. Terminal 40 is connected to the input of an A.C. amplifier 44 via a resistor 42 connected in series with a capacitor 43, the junction between resistor 42 and capacitor 43 being designated as junction A. The output of amplifier 44 is coupled to the input of a D.C. amplifier 46 via a capacitor 45, the connection between the capacitor and the amplifier being designated as junction B. The output of D.C. amplifier 46 is connected to a trigger circuit 47 which in turn is connected to selectively energize a winding 49 of a relay 48 having associated contacts 50. The D.C. amplifier is of the non-inverting type previously described with respect to FIG. 1. The A.C. amplifier is of conventional design and is preferably of the stable low to medium gain non-inverting type. Typically, amplifier 44 would have a gain in the range between 20 and 200. The trigger circuit operates to selectively energize relay 48 in response to the output signal from D.C. amplifier 46 in essentially the same manner as previously described in FIG. 1.

The D.C. regenerative loop from the output to the input of amplifier 46 is completed by means of a resistor 51 and semiconductor diodes 52–55. More specifically, diodes 52 and 53 are connected in parallel with one another and this parallel combination is connected in series with resistor 51 between a junction D and the output of D.C. amplifier 46. The diodes are poled in opposite directions, i.e., with the cathode of diode 52 and the anode of diode 53 each being connected to junction D. Diodes 54 and 55 are connected in parallel between junctions D and B with the cathode of diode 54 connected to junction B and the cathode of diode 55 connected to junction D.

The A.C. regenerative loop includes a single pole double throw switch including a movable contact 58 and stationary contacts 59 and 60. This switch can be part of a conventional mechanical chopper switch energized from an A.C. source. Stationary contact 59 is connected to junction A, stationary contact 60 is connected to ground and the movable contact 58 is connected to ground via a resistor 62. The connection between movable contact 58 and resistor 62 is designated as junction C. A capacitor 63 is connected between junction C and the output of D.C. amplifier 46 via resistor 51. Thus, the A.C. regenerative loop can be traced from the output of D.C. amplifier 46 through resistor 51, capacitor 63, movable contact 58, stationary contact 59, capacitor 43, A.C. amplifier 44, and capacitor 45 back to the input of the D.C. amplifier.

A D.C. ground circuit for interrupting the D.C. regenerative loop is completed from junction D by means of a pair of semiconductor diodes 56 and 57 connected in parallel between junctions D and C. The diodes are poled in opposite directions with the cathode of diode 56 connected to junction C and the cathode of the diode 57 being connected to junction D. A resistor 61 is connected between junction D and the ground.

Assume that movable contact 58 is initially in the position connecting with stationary contact 60. The plate of capacitor 43 connected to junction A is charged in accordance with the input signal and the plate of capacitor 63 is connected to junction C assumes a ground potential.

Thereafter, when movable contact 58 moves to the right, i.e., to the alternate position, junction C is connected to junction A thereby driving the potential at junction A toward ground. A transient potential results which is amplified by amplifiers 44 and 46. The amplified transient potential is coupled back to junction A via capacitor 63 and contacts 58 and 59, and is of the proper polarity to bring about regeneration. As the potential in the A.C. regenerative loop increases, the potential between the output of D.C. amplifier 46 and junction B increases and eventually exceed the forward conducting threshold voltages of either diodes 52 and 54 or diodes 53 and 55. When this occurs, the D.C. amplifier is driven into saturation. The D.C. regenerative loop maintains the D.C. amplifier in the saturated state until junction D is grounded via movable contact 58 and stationary contact 60.

There are several advantages achieved by the use of an A.C. amplifier in the A.C. regenerative loop. The increased gain in the A.C. regenerative loop reduces the size of the regenerative signal which must pass through capacitor 43. As a result, a smaller input capacitor can be employed which has the effect of reducing the current drain on the circuit supplying the input signal. Also, it has been found that when large regenerative currents flow through the input capacitor, there is a tendency for the dielectric of the capacitor to become molecularly polarized, making the capacitor somewhat polarity sensitive. By reducing the size of the regenerative signal which passes through capacitor 43, as is possible with the use of the A.C. amplifier, the problem of dielectric polarization is substantially eliminated. Furthermore, an A.C. amplifier can easily be designed so that no significant noise appears at the input thereof. Hence, the use of the A.C. amplifier further reduces the noise, particularly D.C. noise, which can appear at junction A, thereby further reducing possible contamination of the input signal. Circuits of the type shown in FIG. 5 are realistically capable of accurately responding to signals as small as 10 microvolts at 1 pico-amp (micromicro amp) current levels, or in other words, to signals with as little energy as $10^{-17}$ watts.

Another embodiment of the invention utilizing an A.C. amplifier in the A.C. regenerative loop is shown in FIG. 6. Many of the components are the same as those previously described in FIG. 5 and therefore like reference numerals are employed.

In FIG. 6 the mechanical chopper switch includes a movable contact 70 and stationary contacts 71 and 72 which alternately connect with the movable contact. Stationary contact 72 is connected to junction A and stationary contact 71 is connected to junction D. Movable contact 70 is connected to capacitor 63 and to ground via a resistor 73, the connection to the movable contact being designated as junction C.

In the circuit illustrated in FIG. 5, the output of D.C. amplifier 46 is coupled to junction C through diodes 52, 53, 56 and 57 via junction D. Therefore, when movable contact 58 moves to the right (as viewed in FIG. 5) a small portion of the D.C. noise or low frequency noise present at the output of the D.C. amplifier is coupled to junction A and can therefore contaminate the input signal prior to regeneration in the A.C. loop taking effect. This problem is eliminated in the FIG. 6 embodiment since, when movable contact 70 moves to the left to complete the A.C. regenerative loop, there is no connection between junction D and junction A. Thus, in FIG. 6, the D.C. noise at the output of D.C. amplifier 46 cannot be coupled to junction C and thereafter to junction A via movable contacts 70 and 72, except for the insignificant leakage through capacitor 63.

The circuit in FIG. 6 also provides better interruption of the D.C. regenerative loop at the end of each sampling period. In FIG. 5, it is never possible to completely ground junction D since there is a potential drop of between 0.4 and 0.7 volt across diodes 56 and 57 even when one of the diodes is fully conductive. In FIG. 6, the output of D.C. amplifier 46 can be effectively connected to ground via resistor 51, one or the other of diodes 52 and 53, contacts 70 and 71 and resistor 73. Resistor 51 can have a resistance on the order of 5000 ohms and resistor 73 can have a resistance on the order of 100 ohms. With this ratio of resistance, resistors 51 and 73 form a voltage divider which bring the potential at junction D closer to ground potential than can be achieved with the circuit in FIG. 5. Thus, the circuit illustrated in FIG. 6 provides better interruption of the D.C. regenerative loop. The voltage divider formed by resistors 51 and 73 tends to decrease gain in the regenerative loops. However, this does not present a problem because of the more than sufficient gain provided by amplifiers 44 and 46. The effect of resistor 73 upon the gain in the regenerative loop can be reduced substantially by inserting a small inductive element in series with resistor 73.

FIG. 7 is a more detailed schematic diagram illustrating a highly sensitive translating circuit which is basically of the type shown in FIG. 3. Illustrated in FIG. 7 is a diode protection circuit coupled to the input, several techniques for further improving the isolation between the D.C. amplifier and the input circuit, and a hysteresis circuit which, in effect, determines the state of the output signal in the event that the input signal is zero.

The input circuit 100 couples a pair of input terminals 101 and 102 to junction A. Input terminal 102 is connected to ground whereas input terminal 101 is connected to junction A through a resistor 103 connected in series with a resistor 104. A pair of semiconductor diodes 106 and 107 are connected in parallel between ground and junction 105 betwen series resistors 103 and 104. The anode of diode 106 and the cathode of diode 107 are connected to junction 105. A resistor 108 is connected between junction A and the ground.

The translating circuits in accordance with this invention respond to extremely small input signals, and therefore, it is desirable to protect the input portion of the system from large input signals. This protection is achieved by means of diodes 106 and 107. A characteristic of semiconductor diodes is that they display a relatively high impedance when reverse biased and also display a high impedance when forward biased until such time as the forward conducting threshold voltage is exceeded. This forward conducting threshold voltage is typically on the order of 0.4 volt for the anticipated current levels. Accordingly, if the input signal applied between terminals 101 and 102 is less than the forward conducting threshold voltage of the diodes, both diodes exhibit a high impedance characteristic and have no significant effect upon the input signal. On the other hand, if the input signal exceeds the forward conducting threshold voltage, one of the diodes becomes conductive and prevents further increases in potential as seen from junction A. This limiting of the input signal has no effect upon the output signal due to the regeneration which takes place.

Junction A is coupled to junction B at the input of a D.C. amplifier 110 by means of a coupling network 111. The coupling network includes a capacitor 112 connected directly between junctions A and B and diodes 113–116 connected in parallel with the capacitor. Diodes 113 and 114 are connected in series and are poled to permit current flow in the same direction from junction B to junction A. Diodes 115 and 116 are similarly connected in series and are poled so that they permit current flow from junction A to junction B. The cathodes of diodes 114 and 115 as well as the anodes of diodes 113 and 116, are coupled to a common junction 117 which is connected to ground via a resistor 118. Junction B is coupled to ground via a resistor 119.

As has previously been mentioned, it is very important that the amplifier be isolated from junction A so that the noise present in the amplifier will not contaminate the input signal. In the quiescent state when the feedback circuits are disabled, none of diodes 113–116 are conductive and therefore each of these diodes is, in effect, a high impedance resistor. Diodes 114 and 116 are effectively in series with resistor 118 and therefore provide a voltage divider with respect to junction B. The amplifier noise appearing at junction 117 is reduced substantially by means of the voltage divider effect. A further attenuation of the noise is achieved by means of the high impedance of diodes 113 and 115 which couple junction 117 to junction A. Typically, the combination of diodes 114, 116 and resistor 118 reduce the noise by a factor of 100, and diodes 113 and 115 further reduce the noise by a factor of 10. Thus, network 111 provides substantial isolation between junctions A and B with respect to the low frequency and D.C. noise present in the amplifier.

D.C. amplifier 110 is a stable negative feedback amplifier designed so that the input (junction B) and the feedback point at the output of the amplifier (junction E) are both substantially at ground potential when the system is in a quiescent state, that is, when the regenerative feedback circuits are disabled. The amplifier includes an input transistor 120 of the NPN type, an output transistor 121 of the PNP type and a feedback transistor 122 of the NPN type. These transistors are energized from a power supply which provides both positive and negative potentials with respect to ground, these positive and negative potentials typically being on the order of twelve volts.

The cathode of a diode 123 is connected to the emitter of transistor 121 and to ground via a resistor 124. Diode 123 provides emitter bias for transistor 121 and maintains the emitter at a potential approximately 0.7 volt below that of the positive supply when transistor 121 is conductive. The collector of transistor 121 is connected to the negative supply via output voltage divider network 125. More specifically, the collector of transistor 121 is connected to a junction 126 which in turn is connected to the anodes of semiconductor diodes 127 and 131. The cathode of diode 127 is connected to the negative source via resistors 128, 129 and 130 connected in series thereby forming junction E between resistors 128 and 129, junctions 135 and 136 at the other ends, respectively, of resistors 128 and 129. The cathode of diode 131 is connected to the negative source through resistors 132 and 133 connected in series forming junction 134 between the resistors. Diodes 127 and 131 isolate the output circuits so that loading at one output, junction 134 for example, will not have any effect upon signals appearing at the other portions of the output circuit such as junction E. A capacitor 137 is connected between junction 126 and the base of transistor 122 to bypass diode 127 and resistors 128 and 139.

In the quiescent state, transistors 120, 121 and 122 are all in a partially conductive state. Resistor 130 has a resistance value which is selected so that, considering the partially conductive state of transistor 121, the potential at junction E will be substantially zero when the amplifier is in the quiescent state. Resistors 128 and 129 are of equal resistance values and are selected so that junction 135 is slightly positive and junction 136 is slightly negative to provide potentials for back biasing diodes at network 150 when the system is in the quiescent state.

Junction E is connected to the base of transistor 122 via a resistor 139 and the base of transistor 122 is coupled to ground via a resistor 146. The collector of transistor 122 is connected to the positive source via a resistor 145. The emitter of input transistor 120 is connected to the negative source via series resistors 142 and 143 providing junction 144 between the resistors, which junction is connected to the emitter of transistor 122. The base of transistor 120 is connected to junction B and the collector thereof is connected to the positive source via resistors 140 and 141 connected in series, the base of transistor 121 being connected to the junction between these resistors.

In the quiescent state junction B is maintained essentially at ground potential by resistor 119. Due to the differential amplifier circuit configuration of transistors 120 and 122, the base of transistor 122 must be at essentially the same potential as the base of transistor 120, and therefore, junction E coupled to the base of transistor 122 is also maintained at ground potential. These potentials in the quiescent state are established because of the high negative feedback achieved via transistor 122. Thus, in the quiescent state, junctions B and E are both at ground potential thereby minimizing contamination of the input signal at junction A which might otherwise occur by means of leakage through networks 111 and 150.

If junction B is driven positive, transistors 120 and 121 both become increasingly conductive thereby driving junction E positive. The increased positive potential at junction E renders transistor 122 somewhat more conductive which in turn effects negative feedback by increasing the potential at junction 144 to thereby decrease the emitter-base potential of transistor 120. Conversely, if the potential at junction B is driven negative, transistors 120, 121 and 122 all become less conductive and the potential at junction E is therefore driven negative.

Junction E is coupled to junction C via a network 150 which includes a capacitor 151 and two sets of oppositely directed feedback circuit diodes. Semiconductor diodes 154 and 153 are connected in series with the cathode of diode 153 connected to junction 135 and the anode of diode 154 connected to junction C. Semiconductor diodes 155 and 156 are connected in series with the anode of diode 156 connected to junction 136 and the cathode of diode 155 connected to junction C. The cathodes of diodes 154 and 156, as well as the anodes of diodes 153 and 155, are connected to a common junction 152 which is coupled to ground via a resistor 157. Capacitor 151 is connected in parallel with diodes 153 and 154, or in other words, between junction 135 and junction C.

As previously mentioned, the potential at junction 135 is slightly positive and the potential at junction 136 is slightly negative when the system is in the quiescent state, and therefore, diodes 153 and 156 are back biased. During the quiescent state, it is desirable to back bias these diodes since the diode impedance is higher than would be the case if the diodes were merely in a forward biased non-conductive state. Network 150 operates essentially the same as network 111, that is, diodes 153 and 156 form a voltage divider with resistor 157 to substantially attenuate any D.C. and low frequency noise appearing at junction E, and diodes 154 and 155 further attenuate the noise. Accordingly, there is no significant leakage through network 150 which can contaminate the input signal.

Junction C is periodically connected to junction A by means of a mechanical chopper switch 160 which includes a 60 cycle energized driving coil 161 and a movable contact 164 which moves between a pair of stationary contacts 162 and 163 at a 60 cycle rate. Stationary contact 162 is connected directly to junction A and movable contact 164 is connected directly to junction C. A pair of oppositely poled diodes 167 and 168 are connected in parallel between junctions A and C to eliminate problems associated with switch bounce. Stationary contact 163 is connected to ground through small resistor 166, and to junction C via a large resistor 165.

The system is in the quiescent state when movable contact 164 is moved to the left so that it connects with stationary contact 163. Under these circumstances, the plate of capacitor 151 which is coupled to junction C assumes a potential very close to ground and the plate of capacitor 112 which is connected to junction A assumes the potential of the input signal.

Thereafter, when movable contact 164 moves to its alternative position, capacitor 151 is coupled to capacitor 112 thereby producing a transient at junction B. This transient is amplified by amplifier 110 and is then fed back via the A.C. regenerative circuit including capacitors 137, 151 and 112. The signal builds up until either the D.C. regenerative circuit completed through diodes 113, 114, 153 and 154, or the D.C. regenerative circuit completed through diodes 115, 116, 155 and 156, becomes effective. The D.C. regenerative circuit then drives the amplifier into a selected state of saturation which is indicative of the input signal polarity. When movable contact 164 thereafter returns to its initial position, junction C is again grounded thereby breaking the regenerative loops.

Also connected to the output of amplifier 110 is a trigger circuit 170 of the Schmitt type. The trigger circuit is designed so that its dead range is centered about a zero potential point so that once the circuit is triggered into a saturated state by a pulse of one polarity, the circuit will remain in that saturated state until a pulse of the opposite polarity is applied. The trigger circuit includes an input transistor 171 of the PNP type and an output transistor 172 of the NPN type. The transistors are triggered into a conductive state in response to a negative input signal, and when conductive energize an actuating winding 173 of a relay 174.

The output signal from amplifier 110 is taken from junction 134 which is coupled to the base of transistor 171 via resistors 175 and 176 connected in series. A filter capacitor 177 is connected between ground and the junction between these resistors to prevent amplifier transients from effecting the state of the trigger circuit. A diode 178 is connected in parallel with resistor 175 so that the output impedance of the amplifier as seen from the trigger circuit remains substantially constant despite the changing states of conductivity of transistor 121. The anode of semiconductor diode 179 is connected to the base of transistor 171, and the cathode thereof is connected to ground.

The emitter of transistor 171 is connected directly to ground, and the collector is connected to the negative source via series connected resistors 180 and 181, the base of transistor 172 being connected to the junction between resistors 180 and 181. The collector of transistor 172 is connected to the positive source via winding 173, and the emitter of this transistor is connected to the negative source via a biasing diode 182. Resistor 183 is connected between the collector of transistor 172 and the base of transistor 171 to provide regenerative feedback. Diode 185 and series resistor 184 are connected across winding 173 to provide a path for current flow when the magnetic field of the winding collapses, and thereby protect transistor 172 from inductive switching transients.

When a negative signal appears at junction 134, this negative signal is coupled to the base of transistor 171 thereby rendering transistor 171 conductive which in turn renders transistor 172 conductive by driving the base thereof in a positive direction toward ground. When transistor 172 is conductive, its collector becomes negative and, therefore, the voltage divider formed by back biased diode 179 and feedback resistor 183 drives the base of transistor 171 further negative. The positive feedback created via resistor 183 quickly renders the transistors fully conductive and is sufficient to maintain them in a conductive state even though the negative signal at junction 134 may be removed. When transistor 172 becomes conductive, current flows through winding 173 thereby actuating relay 174.

The trigger circuit remains in the energized state until a positive pulse appears at junction 134. This positive pulse overcomes the feedback signal at the base of transistor 171 and back biases the emitter-base circuit so that transistor 171 becomes non-conductive which in turn renders transistor 172 non-conductive. When transistor 172 is non-conductive, current flow through winding 173 (although not sufficient to energize the winding) passes through resistor 183 and diode 179 to maintain the base of transistor 171 slightly positive. This small positive bias signal on the base of transistor 171 maintains the transistor in a fully non-conductive state even though the positive signal at junction 134 is removed.

Accordingly, if the input signal is positive at terminal 101 with respect to terminal 102, this signal is inverted and appears as a negative signal at junction 134 which in turn activates the trigger circuit and energizes relay 174. Successive sampling of the positive input signal at terminals 101 and 102 produces successive negative pulses at junction 134 which have no effect upon trigger circuit 170. However, if the input signal becomes negative, positive pulses begin to appear at junction 134 which in turn de-energizes the trigger circuit and relay 174. In this manner, the pulses at the output of amplifier 110 created by the successive sampling of the input signal are eliminated.

The nature of the system shown in FIGURE 7 is that it cannot remain in the quiescent state when the regenerative circuits are effective, but instead, must go into one or the other of the saturated states. Therefore, if the input signal happens to be zero, the system provides ambiguous indications. This problem can largely be eliminated by building some hysteresis into the system so that the system will automatically prefer the state corresponding to the last meaningful indication.

This is achieved by coupling a small portion of the trigger circuit output signal back to junction C. More specifically, resistors 186 and 187 are connected in series between the collector of transistor 172 and ground. A variable tap on resistor 187 is connected to junction C via resistor 165.

A positive signal at input terminal 101, when sampled, provides a negative transient at junction B, which transient is then regenerated and ultimately energizes trigger circuit 170 to render transistor 172 conductive. When transistor 172 is in its conductive state, its collector and the adjustable tap on resistor 187 are both negative. During the quiescent state, the small negative potential appearing on resistor 187 is coupled back to junction C and places a small negative charge on capacitor 151. If during the next sampling period the input signal is zero, the small negative charge on capacitor 151 is transferred to the input of the amplifier at junction B and is thereafter regenerated to provide the same signal to the trigger circuit as would be provided if the positive input signal were still present at terminal 101. On the other hand, if the input signal were initially negative, transistor 172 would be rendered non-conductive and its collector would therefore be positive. Accordingly, a positive signal would be fed back to capacitor 151, which would thereafter provide an output indication as though a negative signal were still present at input terminal 101. Thus, in the absence of an input signal, the system prefers the state of the last previous meaningful input signal.

In systems operating at relatively slow chopper speeds, such as the 60 cycle speed of chopper switch 160, it is possible to connect the tap of resistor 187 directly to junction C, and to connect stationary contact 163 directly to ground. With this arrangement, capacitor 151 is charged during the short time interval while movable contact 164 moves from stationary contact 163 to stationary contact 162. However, where faster chopper switches are employed, such as those operating at 400 cycles per second, this time interval may not be sufficient to charge capacitor 151 and, therefore, the arrangement shown in FIG. 7 is preferred including resistors 165 and 166 since it permits charging of capacitor 151 while movable contact 164 is in the position connecting with stationary contact 163.

In the various illustrated embodiments, the circuits are shown connected to ground. Throughout the specification these ground connections merely designate connections to a common reference potential against which the input signal can be compared and thus do not necessarily designate a zero potential level.

While only a few illustrative embodiments have been described in detail, it should be obvious that there are numerous variations within the scope of this invention. The invention is more particularly defined in the appended claims.

What is claimed is:

1. In a highly sensitive translating circuit, the combination of
- an amplifier having an input and an output;
- first circuit means forming an A.C. regenerative loop between the output and input of said amplifier;
- second circuit means forming a D.C. regenerative loop between the output and input of said amplifier;
- means connected in said loops to periodically activate and deactivate said regenerative loops;
- third circuit means connected to apply an input signal to the input of said amplifier while said regenerative loops are activated;
- whereby said input signal is first regenerated by said A.C. regenerative loop and thereafter regenerated by said D.C. regenerative loop to provide a signal at the output of said amplifier indicative of said input signal.

2. A translating circuit in accordance with claim 1 wherein said third circuit means comprises
- an input terminal; and
- capacitance connected to couple said input terminal to the input of said amplifier and prevent noise generated by said amplifier from contaminating the applied input signal.

3. A translating circuit in accordance with claim 1 wherein said second circuit means includes at least one series connected semiconductor diode in the D.C. regenerative loop which becomes conductive to render said D.C. regenerative loop effective as a result of regeneration in said A.C. regenerative loop.

4. In a highly sensitive translating circuit, the combination of
- a D.C. amplifier having an input and an output;
- a first capacitance connected to the input of said amplifier;
- input circuit means for applying an input signal to said first capacitance;
- a second capacitance;
- switch means having a first and a second state, said switch means
  - being operative to couple said second capacitance to a reference potential when in said first state, and
  - being thereafter operable, when in said second state, to couple said second capacitance to said first capacitance to thereby provide a transient potential representative of said input signal at the input of said amplifier;
- circuit means including said first and second capacitance for completing an A.C. regenerative loop between the output and input of said amplifier capable of regenerating said transient potential; and
- circuit means completing a D.C. regenerative loop between the output and input of said amplifier, said D.C. regenerative loop being operative to drive said amplifier into a state of saturation in response to regeneration of said transient potential in said A.C. regenerative loop.

5. A translating circuit in accordance with claim 4 wherein said switch means is operative to deactivate the operation of said regenerative loops when in said first state.

6. A translating circuit in accordance with claim 4 further comprising voltage sensitive means connected in said D.C. regenerative loop and operative to activate said D.C. regenerative loop when the amplitude of the regenerated transient potential exceeds a predetermined level.

7. A translating circuit in accordance with claim 6 wherein said voltage sensitive means comprises at least one semiconductor diode operatively connected in said D.C. regenerative loop to bypass at least one of said first and second capacitance.

8. A translating circuit in accordance with claim 4 wherein said A.C. regenerative loop further includes an A.C. amplifier operatively connected therein to amplify said transient potential.

9. A translating circuit in accordance with claim 8 wherein said A.C. amplifier is connected between said first capacitance and the input of said D.C. amplifier, and
- said D.C. regenerative loop includes semiconductor diode means connected therein to bypass said first and second capacitance and said A.C. amplifier.

10. In a highly sensitive translating circuit, the combination of
- a D.C. amplifier having an input and an output;
- a capacitance connected to the input of said amplifier;
- input circuit means connected to couple an input signal to said capacitance;
- means connected between said input circuit and said capacitance and operative to periodically provide a transient potential representative of said input signal, said transient potential being provided at the input of said amplifier via said capacitance;
- an A.C. feedback circuit including said capacitance and connected between the output and input of said amplifier to regenerate said transient potential;
- a semiconductor diode connected to bypass said capacitance; and
- a D.C. feedback circuit including said diode and connected between the output and input of said amplifier, said D.C. feedback circuit being operative to provide further regeneration when the potential across said capacitance exceeds the forward conducting threshold voltage of said diode.

11. A translating circuit in accordance with claim 10 wherein said A.C. feedback circuit further includes a second capacitance therein, and
- said D.C. feedback circuit further includes a second semiconductor diode connected to bypass said second capacitance.

12. A translating circuit in accordance with claim 11 wherein said means is a switch having a first and a second position, said switch being so connected between said capacitances that
- the input signal is impressed upon said first capacitance and a reference potential is impressed upon said second capacitance when said switch is in said first position, and said capacitances are thereafter connected to one another to provide said transient potential when said switch is placed in said second positon.

13. A translating circuit in accordance with claim 12 wherein said switch is connected so that said feedback circuits are rendered operative only when said switch is in said second positon.

14. A translating circuit in accordance with claim 13 further comprising a semiconductor diode connected across said switch to prevent interruption of said feedback circuits when said switch is in neither said first or second positon.

15. In a highly sensitive translating circuit, the combination of
an amplifier having an input and an output;
first circuit means forming an A.C. regenerative loop between the output and input of said amplifier;
second circuit means forming a D.C. regenerative loop between the output and input of said amplifier;
a switch having a first position and a second position, said switch being connected
so that said regenerative loops are deactivated when said switch is in said first portion, and
so that said regenerative loops are activated when said switch is in said second position;
diode means connected across said switch to sustain activation of said regenerative loops when said switch is in neither said first nor second position; and
third circuit means adapted to apply an input signal to the input of said amplifier while said regenerative loops are activated;
whereby said input signal is first regenerated by said A.C. regenerative loop and thereafter regenerated by said D.C. regenerative loop to provide a signal at the output of said amplifier indicative of said input signal.

16. In a highly sensitive translating circuit, the combination of
a D.C. amplifier having an input and an output;
a capacitance connected to the input of said amplifier;
input circuit means adapted to couple an input signal to said capacitance;
switch means connected to said capacitance and having a first position and a second position;
diode means connected across said switch means and said capacitance;
first circuit means including said capacitance and said switch means for completing an activated A.C. regenerative loop between the output and the input of said amplifier when said switch means is in said second position; and
second circuit means including said diode means for forming a D.C. regenerative loop between the output and the input of said amplifier, said D.C. regenerative loop being activated when said switch means is in said second position and being deactivated when said switch means is in said first position;
said diode means being operative to sustain activation of said regenerative loop when said switch means is in neither said first nor second position.

17. In a highly sensitive translating circuit, the combination of
a D.C. amplifier having an input and an output;
first circuit means for forming a D.C. regenerative loop between the output and the input of said D.C. amplifier;
an A.C. amplifier;
second circuit means including said A.C. amplifier for forming an A.C. regenerative loop between the output and the input of said D.C. amplifier;
means connected to said regenerative loop and operative to periodically activate and deactivate the operation of said regenerative loops; and
third circuit means connected to provide a signal at the input of said D.C. amplifier representative of an input signal while said regenerative loops are activated;
whereby said signal applied to the input of said D.C. amplifier is first regenerated in said A.C. regenerative loop and thereafter regenerated in said D.C. regenerative loop to provide an output signal at the output of said D.C. amplifier so long as said regenerative loops remain activated, said output signal being indicative of said input signal.

18. A translating circuit in accordance with claim 17 further comprising voltage sensitive means connected in said D.C. regenerative loop therein to render said D.C. regenerative loop operative when the potential developed in said A.C. regenerative loop exceeds the conducting threshold voltage of said means.

19. A translating circuit in accordance with claim 18 wherein said voltage sensitive means comprises at least one semiconductor diode.

20. A translating circuit in accordance with claim 17 wherein said means operative to impair the operation of said regenerative loops includes a switch periodically operative
to interrupt said A.C. regenerative loop, and
to couple one point in said D.C. regenerative loop to ground.

21. A translating circuit in accordance with claim 20 further comprising a semiconductor diode and wherein said switch is operative to couple said point in said D.C. regenerative loop to ground via said diode.

22. A translating circuit in accordance with claim 20 further comprising a resistance and wherein said point in said D.C. regenerative loop is coupled to ground via said resistance.

23. In a highly sensitive translating circuit, the combination of
circuit means responsive to applied transient signals and having a latching characteristic operative to provide a predetermined output signal in response to an applied transient having a predetermined initial direction;
a first capacitance connected to the input of said latching circuit;
input circuit means for applying an input signal to said first capacitance;
a second capacitance;
switch means having a first and a second state, said switch means
being operative to couple said second capacitance to a reference potential when in said first state whereby said first capacitance gradually assumes a charge corresponding to the input signal and said second capacitance assumes a charge corresponding to said reference potential, and
being thereafter operable, when placed in said second state, to couple said first capacitance to said second capacitance to thereby provide a rapid transient potential representative of said input signal, said rapid transient being provided at the input of said circuit means having said latching characteristic.

24. A translating circuit in accordance with claim 23 wherein said latching circuit comprises
a D.C. amplifier having an input and an output; and
a D.C. regenerative loop connected between the output and input of said amplifier.

25. In a highly sensitive translating circuit, the combination of
an amplifier having an input and an output;
first circuit means forming an A.C. regenerative loop between the output and input of said amplifier;
second circuit means forming a D.C. regenerative loop between the output and input of said amplifier;
means connected to periodically activate and deactivate said regenerative loops;

a pair of input terminals adapted to receive an input signal;
third circuit means to couple said input terminals to the input of said amplifier while said regenerative loops are activated, whereby said input signal is first regenerated by said A.C. regenerative loop and thereafter regenerated by said D.C. regenerative loop to provide a signal at the output of said amplifier indicative of said input signal; and
signal limiting circuit means connected between said input terminals and comprising a pair of oppositely poled semiconductor diodes connected
so that said diodes provide a high imepdance between said input terminals when the input signal has an amplitude less than the forward conducting threshold level of said diodes, and
so that one or the other of said diodes becomes conductive to limit the input signal reaching said third circuit means to said forward conducting threshold level when larger signals are applied to said input terminal.

26. In a highly sensitive translating circuit, the combination of
a D.C. amplifier having an input and an output;
a capacitance connected to the input of said amplifier;
input circuit means connected to couple an input signal to said capacitance;
means connected to said capacitance and operative to periodically provide a transient potential representative of said input signal, said transient potential being provided at the input of said amplifier via said capacitance;
an A.C. feedback circuit including said capacitance and connected between the output and input of said amplifier to regenerate said transient potential;
a pair of semiconductor diodes connected in series and connected to bypass said capacitance;
an impedance connected to the junction between said diodes to form a voltage divider with that one of said diodes closest said amplifier to thereby substantially reduce leakage from the input of said amplifier to said input circuit means via said diodes when said diodes are non-conductive; and
a D.C. feedback circuit including said diodes and connected between the output and input of said amplifier, said D.C. feedback circuit being operative to provide further regeneration when the potential across said capacitance exceeds the forward conducting threshold voltage of said diodes connected in series.

27. A translating circuit in accordance with claim 26 further comprising
a second pair of semiconductor diodes connected in series and connected to bypass said capacitance with the junction between the diodes of said second pair being connected to said junction between the diodes of said first pair, and
wherein said second series pair of diodes is included in said D.C. feedback circuit to permit current flow in a direction opposite to that permitted by said first pair when the potential across said capacitance exceeds the forward conductance threshold voltage of said second pair of diodes.

28. In a highly sensitive translating circuit, the combination of
an input circuit;
a D.C. amplifier having an input and an output;
a first network coupling said input circuit to the input of said amplifier and a second network coupling said input circuit to the output of said amplifier, each of said networks comprising
a capacitance,
a series pair of semiconductor diodes connected to bypass said capacitance, and
an impedance connected to the junction between said diodes to form a voltage divider with one of said diodes when the same is nonconductive to thereby provide a low voltage D.C. isolation between the amplifier and said input circuit;
circuit means for completing an A.C. regenerative path via the capacitances of said networks;
circuit means for completing a D.C. regenerative path via the diodes of said networks; and
means coupled to said regenerative paths for periodically disabling said regenerative paths.

29. A translating circuit in accordance with claim 28 wherein each of said networks further comprises a second series pair of diodes connected to bypass said capacitance, said first and second pairs of diodes being connected to bypass current in opposite directions around said capacitance.

30. A translating circuit in accordance with claim 28 wherein said input circuit includes a pair of input terminals, one of said input terminals being connected to a reference potential, and wherein the input and the output of said amplifier are at said reference potential while said regenerative paths are disabled.

31. In a highly sensitive translating circuit, the combination of
a D.C. amplifier having an input and an output;
an input circuit coupled to the input of said amplifier and adapted to receive an input signal;
an A.C. regenerative circuit coupled between the output and input of said amplifier;
a D.C. regenerative circuit coupled between the output and input of said amplifier, said D.C. regenerative circuit being inoperative with respect to signals below a predetermined level, but effective to override said A.C. regenerative circuit when operative;
switching means for periodically activating and deactivating said regenerative circuits so that said input signal is periodically sampled and pulses representative of said input signal appear at the output of said amplifier; and
bistable circuit means connected to the output of said amplifier, said circuit means being responsive to said pulses and operative to provide a continuous signal functionally related to the input signal being sampled.

32. A translating circuit in accordance with claim 31 further comprising circuit means for coupling said bistable circuit means to said input circuit to feed back a signal which will cause said translating circuit to continue providing an output indication representative of the last previous input signal whenever an input signal is absent.

33. In a highly sensitive translating circuit, the combination of
a D.C. amplifier having an input and an output;
a first capacitance connected to the input of said amplifier;
input circuit means for applying an input signal to said first capacitance;
a second capacitance;
circuit means including said first and second capacitance for completing an A.C. regenerative loop between the output and input of said amplifier capable of regenerating a transient potential; and
circuit means completing a D.C. regenerative loop between the output and input of said amplifier, said D.C. regenerative loop being operative to drive said amplifier into a state of saturation in response to regeneration of said transient potential in said A.C. regenerative loop;
bistable circuit means connected to the output of said amplifier and capable of assuming a state in accordance with the amplifier output signal; and
switch means having a first and a second state, said switch means being operative to couple said second capacitance to a potential which is determined in accordance with the state of said bistable circuit means, and being thereafter operable, when in said second state, to couple said second capacitance to said first capacitance to thereby provide said transient potential at the input of said amplifier, said transient potential being representative of the input signal or representative of the state of said bistable circuit in the event that an input signal is absent.

References Cited by the Examiner

UNITED STATES PATENTS

| | | | |
|---|---|---|---|
| 2,828,450 | 3/1958 | Pinckaers | 330—26 X |
| 2,968,005 | 1/1961 | Patmore | 330—9 |
| 3,047,797 | 7/1962 | Borsboom | 330—9 X |
| 3,106,684 | 10/1963 | Luik | 330—112 X |
| 3,142,803 | 7/1964 | Bigelow | 330—9 |

ROY LAKE, *Primary Examiner.*

NATHAN KAUFMAN, *Examiner.*

R. P. KANANEN, *Assistant Examiner.*